(12) United States Patent
Edwards

(10) Patent No.: US 7,970,770 B2
(45) Date of Patent: Jun. 28, 2011

(54) EXTENSION OF WRITE ANYWHERE FILE LAYOUT WRITE ALLOCATION

(75) Inventor: John K. Edwards, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 73 days.

(21) Appl. No.: 12/042,131

(22) Filed: Mar. 4, 2008

(65) Prior Publication Data

US 2008/0155220 A1    Jun. 26, 2008

Related U.S. Application Data

(63) Continuation of application No. 10/836,090, filed on Apr. 30, 2004, now Pat. No. 7,430,571.

(51) Int. Cl.
*G06F 17/30* (2006.01)
(52) U.S. Cl. .................................................. 707/743
(58) Field of Classification Search .................. None
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,843,541 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,916,608 A | 4/1990 | Shultz |

(Continued)

FOREIGN PATENT DOCUMENTS

EP    0694831 A2    1/1996

(Continued)

OTHER PUBLICATIONS

Peterson, Zachary, "Data Placement for Copy-On-Write Using Virtual Contiguity," Sep. 2002, University of California—Santa Cruz, Department of Computer Science, pp. 1-68.*

(Continued)

*Primary Examiner* — Neveen Abel-Jalil
*Assistant Examiner* — Farhan M Syed
(74) *Attorney, Agent, or Firm* — Cesari and McKenna, LLP

(57) ABSTRACT

A write allocation technique extends a conventional write allocation procedure employed by a write anywhere file system of a storage system. A write allocator of the file system implements the extended write allocation technique in response to an event in the file system. The extended write allocation technique efficiently allocates blocks, and frees blocks, to and from a virtual volume (vvol) of an aggregate. The aggregate is a physical volume comprising one or more groups of disks, such as RAID groups, underlying one or more vvols of the storage system. The aggregate has its own physical volume block number (pvbn) space and maintains metadata, such as block allocation structures, within that pvbn space. Each vvol also has its own virtual volume block number (vvbn) space and maintains metadata, such as block allocation structures, within that vvbn space. The inventive technique extends input/output efficiencies of the conventional write allocation procedure to comport with an extended file system layout of the storage system.

41 Claims, 11 Drawing Sheets

U.S. PATENT DOCUMENTS

| | | | |
|---|---|---|---|
| 4,989,206 A | | 1/1991 | Dunphy, Jr. et al. |
| 5,124,987 A | | 6/1992 | Milligan et al. |
| 5,129,088 A | | 7/1992 | Auslander et al. |
| RE34,100 E | | 10/1992 | Hartness |
| 5,155,835 A | | 10/1992 | Belsan |
| 5,163,131 A | | 11/1992 | Row et al. |
| 5,202,979 A | | 4/1993 | Hillis et al. |
| 5,278,979 A | | 1/1994 | Foster et al. |
| 5,355,453 A | | 10/1994 | Row et al. |
| 5,426,747 A | | 6/1995 | Weinreb et al. |
| 5,485,579 A | | 1/1996 | Hitz et al. |
| 5,511,177 A | | 4/1996 | Kagimasa et al. |
| 5,581,724 A | | 12/1996 | Belsan et al. |
| 5,742,752 A | * | 4/1998 | DeKoning ........................ 714/6 |
| 5,764,972 A | | 6/1998 | Crouse et al. |
| 5,778,411 A | | 7/1998 | DeMoss et al. |
| 5,802,366 A | | 9/1998 | Row et al. |
| 5,819,292 A | * | 10/1998 | Hitz et al. ..................... 707/203 |
| 5,828,876 A | | 10/1998 | Fish et al. |
| 5,870,734 A | | 2/1999 | Kao |
| 5,897,661 A | | 4/1999 | Baranovsky et al. |
| 5,907,672 A | | 5/1999 | Matze et al. |
| 5,918,229 A | | 6/1999 | Davis et al. |
| 5,931,918 A | | 8/1999 | Row et al. |
| 5,941,972 A | | 8/1999 | Hoese et al. |
| 5,944,789 A | | 8/1999 | Tzelnic et al. |
| 5,963,962 A | * | 10/1999 | Hitz et al. ..................... 707/202 |
| 5,987,477 A | | 11/1999 | Schmuck et al. |
| 6,038,570 A | | 3/2000 | Hitz et al. |
| 6,065,037 A | | 5/2000 | Hitz et al. |
| 6,173,293 B1 | | 1/2001 | Thekkath et al. |
| 6,173,374 B1 | | 1/2001 | Heil et al. |
| 6,185,655 B1 | | 2/2001 | Peping |
| 6,275,898 B1 | | 8/2001 | DeKoning |
| 6,289,356 B1 | * | 9/2001 | Hitz et al. ..................... 707/201 |
| 6,606,690 B2 | | 8/2003 | Padovano |
| 6,618,798 B1 | | 9/2003 | Burton et al. |
| 6,636,879 B1 | | 10/2003 | Doucette et al. |
| 7,024,427 B2 | * | 4/2006 | Bobbitt et al. ................ 707/200 |
| 7,069,307 B1 | * | 6/2006 | Lee et al. ..................... 709/217 |
| 7,072,910 B2 | * | 7/2006 | Kahn et al. .................... 707/201 |
| 7,809,693 B2 | * | 10/2010 | Lango et al. .................. 707/679 |
| 2002/0083037 A1 | | 6/2002 | Lewis et al. |
| 2002/0112022 A1 | * | 8/2002 | Kazar et al. .................. 709/217 |
| 2002/0116593 A1 | * | 8/2002 | Kazar et al. .................. 711/202 |
| 2004/0030668 A1 | * | 2/2004 | Pawlowski et al. ............... 707/1 |
| 2005/0120078 A1 | * | 6/2005 | Kazar et al. .................. 709/203 |
| 2005/0246401 A1 | | 11/2005 | Edwards et al. |
| 2007/0124341 A1 | * | 5/2007 | Lango et al. .................. 707/202 |

FOREIGN PATENT DOCUMENTS

| | | |
|---|---|---|
| WO | WO 89/10594 | 11/1989 |
| WO | WO 02/065275 A1 | 8/2002 |

OTHER PUBLICATIONS

Quinlan, Sean, "A Cached WORM File System," Dec. 1991, John Wiley & Sons, Sofrware-Prace and Experience, vol. 21 (12), pp. 1289-1299.*

Ousterhout, John et al., "Beating the I/O Bottleneck: A Case for Log-Structured File Systems," Technical Report, Computer Science Division, Electrical Engineering and Computer Sciences, University of California at Berkley, Oct. 1988, pp. 1-18.*

Kent, Jack, et al., "Optimizing Shadow Recovery Algorithms," Feb. 1988, IEEE Transactions on Software Engineering, vol. 14, No. 2, pp. 155-168.*

Kazar, Michael, et al., "DEcorum File System Architectural Overview," USENIX Summer Conference, Anaheim, CA., 1990, pp. 1-13.*

Finlayson, Ross., "Log Files: An Extended File Service Exploiting Write-Once Storage," Sep. 1987, Department of Computer Science, Standford University, pp. 1-14.*

Chutani, Sailesh, "The Episode File System," In the Proceedings of USENIX, Winter 1992, pp. 1-18.*

Fielding et al. (1999) Request for Comments (RFC) 2616, HTTP/1.1.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

David Hitz et al. TR3002 File System Design for a NFS File Server Appliance published by Network Appliance, Inc.

Callaghan B. "NFS Version 3 Protocol Specification", Request for Comments (RFC) 1813 Jun. 1995.

International Search Report PCT/US03/23597, Mar. 9, 2004, 7 pages, International Searching Authority, Alexandria, Virginia, USA.

International Search Report PCT/US03/23597, Apr. 14, 2004, 8 pages, International Searching Authority, Alexandria, Virginia, USA.

Lu, Y. "Performance Study of iSCSI-Based Storage Subsystems", IEEE Communications Magazine, pp. 76-82, Aug. 2003.

Celerra File Server Architecture for High Availability, EMC2 where information lives, Aug. 1999, pp. 1-7.

Ron Lenive and Michelle Gervais, Building a SAN, SunExpert Magazine, Mar. 1999, pp. 50-64.

Unix Workstation System Administration Education Certification Course, Jan. 8, 2002.

Auspex Systems, LFS—A Local File System for Multiprocessor NFS Network Servers, 1994.

Maintenance Procedures ND (8C) nd-network disk control Feb. 1985.

Misc. Reference Manual Pages ND (4P) nd-network disk driver Jul. 26, 1985.

Asante EN/SC Adapter Family Installation Guide May 1994.

Asante Desktop EN/SC Adapters User's Manual Apr. 1996.

Performance Without Compromise: The Virtual Storage Architecture 1997.

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{article I have has no date or cite}.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, Ra, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, *The Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, Feb. 1999 pp. 20-27.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Kazar, Michael Leon, *Synchronization and Caching Issues in the Andrew File System*, Carnegie Mellon University, CMU-ITC-88-063.

Kemper, Alfons, et al., *Performance Tuning for SAP R/3*, Data Engineering Journal 22, Feb. 1999 pp. 33-40.

Kent, Jack et al., Optimizing Shadow Recovery Algorithms, *IEEE Transactions on Software Engineering*, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

U.S. Appl. No. 10/836,090, filed Apr. 30, 2004 by John K. Edwards for Extension of Write Anywhere File Layout Write Allocation, all pages.

Kim et al., "Volume Management in SAN Environment", Parallel and Distributed Systems, 2001, ICPADS 2001, Proceedings Eighth International Conference on Jun. 26-29, 2001, Piscataway, NJ, USA, IEEE, pp. 500-505.

"Notification of Transmittal of the International Search Report and the Written Opinion of the International Searching Authority, or the Declaration", International Application No. PCT/US2005/013566, filed Apr. 24, 2005, mailed Apr. 7, 2006, 10 pages.

* cited by examiner

EXTENSION OF WRITE ANYWHERE FILE LAYOUT WRITE ALLOCATION

CROSS-REFERENCE TO RELATED APPLICATION

The present invention is related to the following commonly assigned U.S. patent application Ser. No. 10/836,817 titled, Extension of Write Anywhere File System Layout, filed by John K. Edwards et al. on Apr. 30, 2004, now issued as U.S. Pat. No. 7,409,494 on Aug. 5, 2008.

RELATED APPLICATIONS

This application is a continuation of U.S. patent application Ser. No. 10/836,090 titled Extension of Write Anywhere File Layout Write Allocation, filed by John K. Edwards on Apr. 30, 2004, now issued as U.S. Pat. No. 7,430,571 on Sep. 30, 2008.

FIELD OF THE INVENTION

The present invention relates to file systems and, more specifically, to write allocation in a write anywhere file system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in A Case for Redundant Arrays of Inexpensive Disks (RAID), by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

When accessing a block of a file in response to servicing a client request, the file system specifies a vbn that is translated at the file system/RAID system boundary into a disk block number (dbn) location on a particular disk (disk, dbn) within a RAID group of the physical volume. Each block in the vbn space and in the dbn space is typically fixed, e.g., 4 k bytes (kB), in size; accordingly, there is typically a one-to-one mapping between the information stored on the disks in the dbn space and the information organized by the file system in the vbn space. The (disk, dbn) location specified by the RAID system is further translated by a disk driver system of the storage operating system into a plurality of sectors (e.g., a 4 kB block with a RAID header translates to 8 or 9 disk sectors of 512 or 520 bytes) on the specified disk.

The requested block is then retrieved from disk and stored in a buffer cache of the memory as part of a buffer tree of the file. The buffer tree is an internal representation of blocks for a file stored in the buffer cache and maintained by the file system. Broadly stated, the buffer tree has an inode at the root (top-level) of the file. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a vbn to facilitate efficiency among the file system and the RAID system when accessing the data on disks.

The RAID system maintains information about the geometry of the underlying physical disks (e.g., the number of blocks in each disk) in raid labels stored on the disks. The RAID system provides the disk geometry information to the file system for use when creating and maintaining the vbn-to-disk, dbn mappings used to perform write allocation operations and to translate vbns to disk locations for read operations. Block allocation data structures, such as an active map, a snapmap, a space map and a summary map, are data structures that describe block usage within the file system, such as the write-anywhere file system. These mapping data structures are independent of the geometry and are used by a write allocator of the file system as existing infrastructure for the logical volume.

Specifically, the snapmap denotes a file including a bitmap associated with the vacancy of blocks of a snapshot. The write-anywhere file system (such as the WAFL file system) has the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is always an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports multiple snapshots that are generally created on a regular schedule. Each snapshot refers to a copy of the file system that diverges from the active file system over time as the active file system is modified. In the case of the WAFL file system, the active file system diverges from the snapshots since the snapshots stay in place as the active file system is written to new disk locations. Each snapshot is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various snapshots require extra storage blocks. The multiple snapshots of a storage element are not independent copies, each consuming disk space; therefore, creation of a snapshot on the file system is instantaneous, since no entity data needs to be copied. Read-only accessibility denotes that a snapshot cannot be modified because it is closely coupled to a single writable image in the active file system. The closely coupled association between a file in the active file system and the same file in a snapshot obviates the use of multiple "same" files. In the example of a WAFL file system, snapshots are described in TR3002 File System Design for a NFS File Server Appliance by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., each of which is hereby incorporated by reference as though full set forth herein.

Changes to the file system are tightly controlled to maintain the file system in a consistent state. The file system progresses from one self-consistent state to another self-consistent state. The set of self-consistent blocks on disk that is rooted by the root inode is referred to as a consistency point (CP). To implement consistency points, WAFL always writes new data to unallocated blocks on disk. It never overwrites existing data. A new consistency point occurs when the fsinfo block is updated by writing a new root inode for the inode file into it. Thus, as long as the root inode is not updated, the state of the file system represented on disk does not change.

The present invention also creates snapshots, which are virtual read-only copies of the file system. A snapshot uses no disk space when it is initially created. It is designed so that many different snapshots can be created for the same file system. Unlike prior art file systems that create a clone by duplicating the entire inode file and all of the indirect blocks, the present invention duplicates only the inode that describes the inode file. Thus, the actual disk space required for a snapshot is only the 128 bytes used to store the duplicated inode. The 128 bytes of the present invention required for a snapshot is significantly less than the many megabytes used for a clone in the prior art.

The present invention prevents new data written to the active file system from overwriting "old" data that is part of a snapshot(s). It is necessary that old data not be overwritten as long as it is part of a snapshot. This is accomplished by using a multi-bit free-block map. Most prior art file systems use a free block map having a single bit per block to indicate whether or not a block is allocated. The present invention uses a block map having 32-bit entries. A first bit indicates whether a block is used by the active file system, and 20 remaining bits are used for up to 20 snapshots, however, some bits of the 31 bits may be used for other purposes.

The active map denotes a file including a bitmap associated with a free status of the active file system. As noted, a logical volume may be associated with a file system; the term "active file system" refers to a consistent state of a current file system.

The summary map denotes a file including an inclusive logical OR bitmap of all snapmaps. By examining the active and summary maps, the file system can determine whether a block is in use by either the active file system or any snapshot. The space map denotes a file including an array of numbers that describe the number of storage blocks used (counts of bits in ranges) in a block allocation area. In other words, the space map is essentially a logical OR bitmap between the active and summary maps to provide a condensed version of available "free block" areas within the vbn space. Examples of snapshot and block allocation data structures, such as the active map, space map and summary map, are described in U.S. Patent Application Publication No. US2002/0083037 A1, titled Instant Snapshot, by Blake Lewis et al. and published on Jun. 27, 2002, now issued as U.S. Pat. No. 7,454,445 on Nov. 18, 2008, which application is hereby incorporated by reference.

The write anywhere file system includes a write allocator that performs write allocation of blocks in a logical volume in response to an event in the file system (e.g., dirtying of the blocks in a file). The write allocator uses the block allocation data structures to select free blocks within its vbn space to which to write the dirty blocks. The selected blocks are generally in the same positions along the disks for each RAID group (i.e., within a stripe) so as to optimize use of the parity disks. Stripes of positional blocks may vary among other RAID groups to, e.g., allow overlapping of parity update operations. When write allocating, the file system traverses a small portion of each disk (corresponding to a few blocks in depth within each disk) to essentially "lay down" a plurality of stripes per RAID group. In particular, the file system chooses vbns that are on the same stripe per RAID group during write allocation using the vbn-to-disk, dbn mappings.

When write allocating within the volume, the write allocator typically works down a RAID group, allocating all free blocks within the stripes it passes over. This is efficient from a RAID system point of view in that more blocks are written per stripe. It is also efficient from a file system point of view in that modifications to block allocation metadata are concentrated within a relatively small number of blocks. Typically, only a few blocks of metadata are written at the write allocation point of each disk in the volume. As used herein, the write allocation point denotes a general location on each disk within the RAID group (e.g., a stripe) where write operations occur.

Write allocation is performed in accordance with a conventional write allocation procedure using the block allocation bitmap structures to select free blocks within the vbn space of the logical volume to which to write the dirty blocks. Specifically, the write allocator examines the space map to determine appropriate blocks for writing data on disks at the write allocation point. In addition, the write allocator examines the active map to locate free blocks at the write allocation point. The write allocator may also examine snapshotted copies of the active maps to determine snapshots that may be in the process of being deleted.

According to the conventional write allocation procedure, the write allocator chooses a vbn for a selected block, sets a bit in the active map to indicate that the block is in use and increments a corresponding space map entry which records, in concentrated fashion, where blocks are used. The write allocator then places the chosen vbn into an indirect block or inode file "parent" of the allocated block. Thereafter, the file system "frees" the dirty block, effectively returning that block to the vbn space. To free the dirty block, the file system typically examines the active map, space map and a summary map. The file system then clears the bit in the active map corresponding to the freed block, checks the corresponding bit in the summary map to determine if the block is totally free and, if so, adjusts (decrements) the space map.

The present invention is directed to a technique that extends the conventional write allocation procedure to comport with an extended file system layout of a storage system.

SUMMARY OF THE INVENTION

The present invention is directed to a write allocation technique that extends a conventional write allocation procedure employed by a write anywhere file system of a storage system. A write allocator of the file system implements the extended write allocation technique in response to an event in the file system. The extended write allocation technique efficiently allocates blocks, and frees blocks, to and from a virtual volume (vvol) of an aggregate. The aggregate is a physical volume comprising one or more groups of disks, such as RAID groups, underlying one or more vvols of the storage system. The aggregate has its own physical volume block number (pvbn) space and maintains metadata, such as block allocation "bitmap" structures, within that pvbn space. Each vvol also has its own virtual volume block number (vvbn) space and maintains metadata, such as block allocation bitmap structures, within that vvbn space. The inventive technique extends input/output (I/O) efficiencies of the conventional write allocation procedure to comport with an extended file system layout of the storage system.

According to the extended write allocation technique, block allocation proceeds in parallel on the vvol and the aggregate when write allocating a block within the vvol, with the write allocator selecting a pvbn in the aggregate and a vvbn in the vvol. The write allocator adjusts the block allocation bitmap structures, such an active map and space map, of the aggregate to record the selected pvbn and adjusts similar structures of the vvol to record the selected vvbn. A virtual volume identifier (vvid) of the vvol and the vvbn are inserted into an owner map of the aggregate at an entry defined by the selected pvbn. The selected pvbn is also inserted into a container map of the vvol. Finally, an indirect block or inode file parent of the allocated block is updated with one or more block pointers to the allocated block. The content of the update operation depends on the vvol embodiment. For a "hybrid" vvol embodiment, the selected pvbn is inserted in the indirect block or inode as a block pointer. However, for a "dual vbn hybrid" vvol embodiment, both the pvbn and vvbn are inserted in the indirect block or inode as block pointers.

When freeing a block from a vvol, the write allocator acquires the vvbn of the corresponding block. In the dual vbn hybrid embodiment, the write allocator acquires the vvbn directly from the indirect block or inode file parent of the freed block. In the hybrid vvol embodiment, however, only the pvbn is available in the indirect block or inode file parent of the freed block; accordingly, the write allocator accesses the owner map of the aggregate in order to acquire the vvbn. Once the vvbn is acquired, the write allocator clears the active map bit entry for the vvbn in the vvol, checks the summary map entry for the vvbn in the vvol and decrements the space map of the vvol if the vvbn is totally free. If the vvbn is totally free, the block may also be "freed" for return to the aggregate. That is, the pvbn is cleared from the container map (at entry vvbn), the active map entry for the pvbn is cleared in the aggregate, the summary map entry for the pvbn is checked in the aggregate and the space map of the aggregate is decremented, as appropriate.

According to an aspect of the invention, freeing of blocks from a vvol may be delayed to allow amortization of the cost among many accumulated update operations. In particular, the inventive technique allows the file system to perform "delayed free" operations from the vvol. A delayed free operation involves clearing of appropriate block allocation bitmaps in the vvol, while delaying the clearing of the container map of the vvol and block allocation bitmaps of the aggregate. When a sufficient number of free blocks have been accumulated for the vvol (or portion of the vvol) all of the accumulated blocks may be freed from a block of the container map at once. A space map style optimization may be applied to the container map of the vvol to keep track of "rich" areas for delayed free operations to improve the efficiency of these operations. When clearing blocks of the vvol from the container map, a further optimization involves not freeing the blocks in the aggregate immediately, but rather accumulating them into a delete log file. The free blocks may be sorted in the delete log to minimize the number of I/O operations associated with the allocation maps of the aggregate.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

Figure 1:
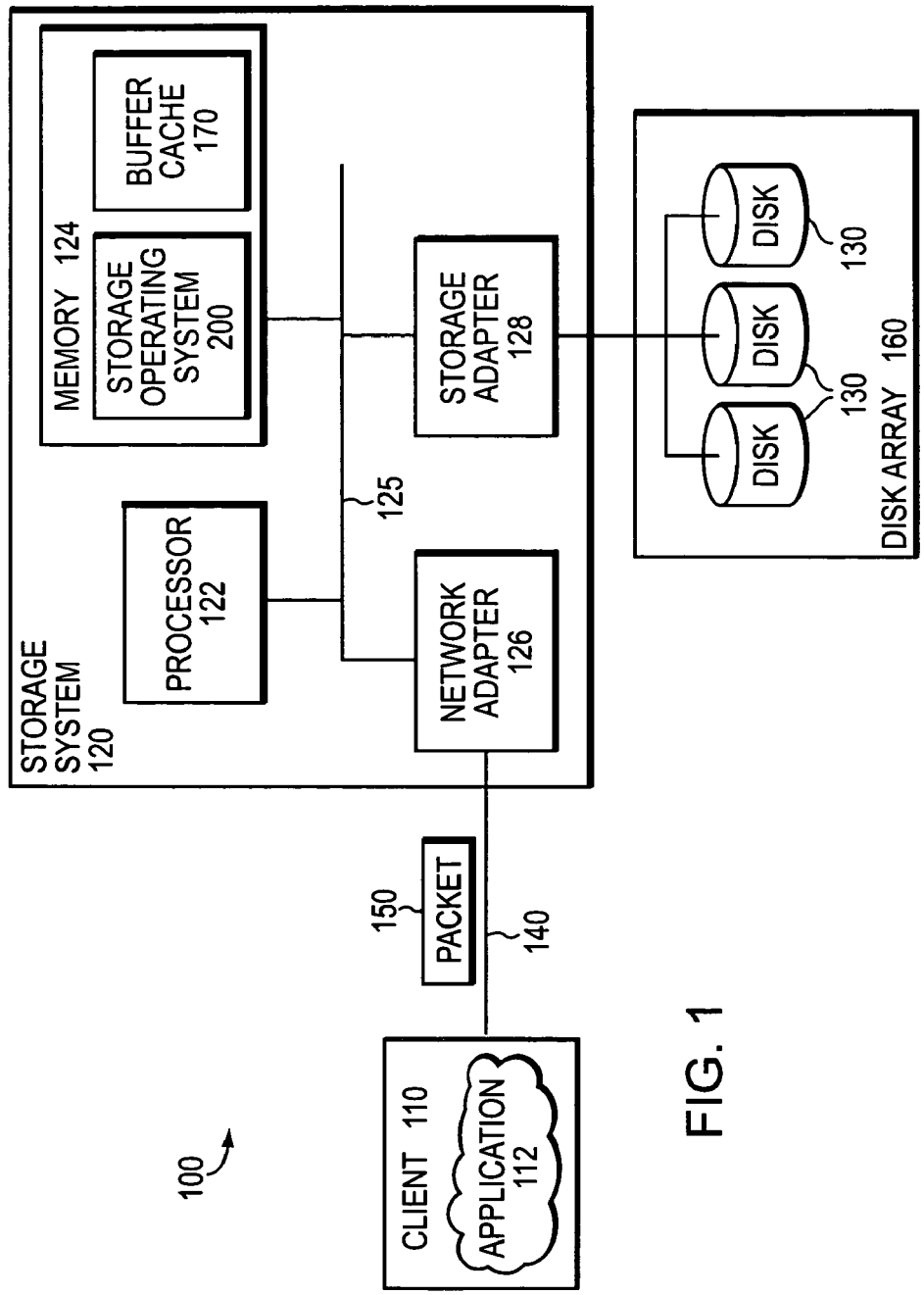
FIG. 1 is a schematic block diagram of an environment including a storage system that may be advantageously used with the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 2:
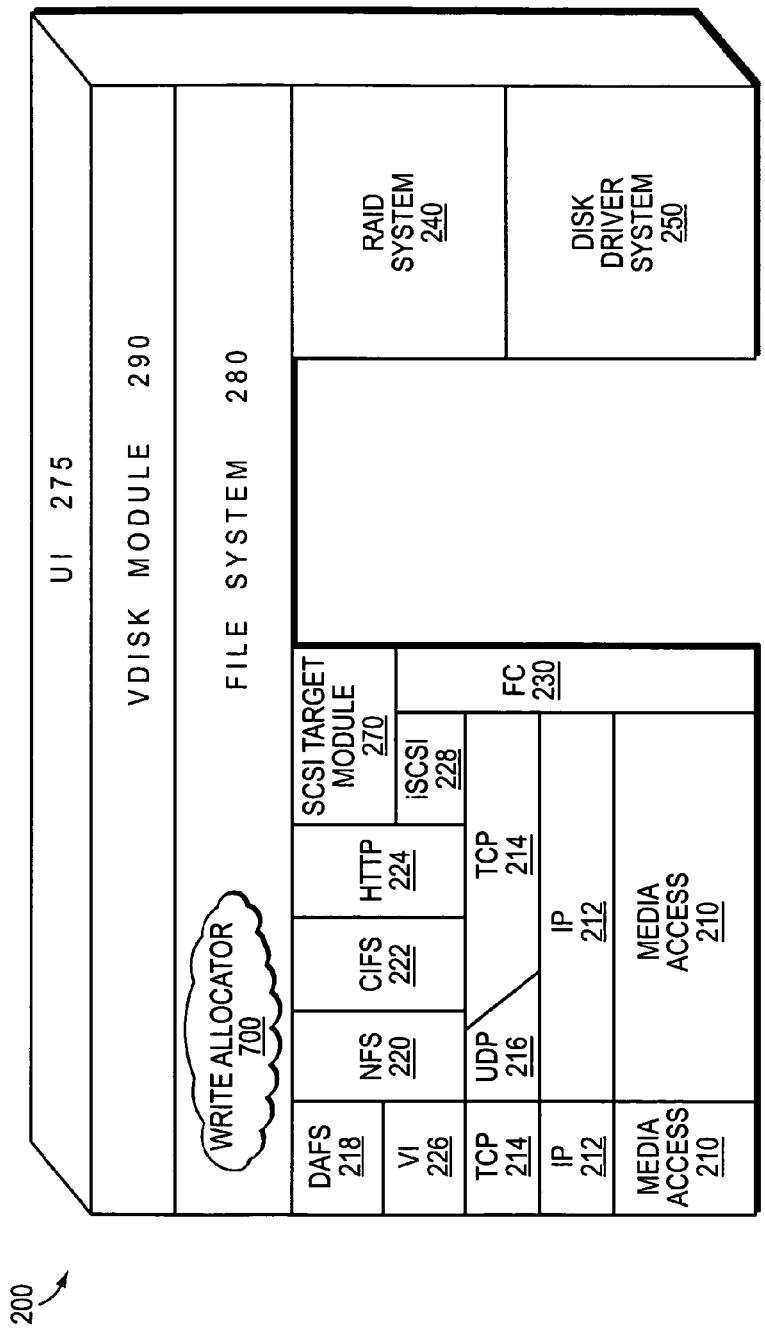
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in U.S. patent application Ser. No. 10/215,917 titled, Multi-Protocol Storage Appliance that provides Integrated Support for File and Block Access Protocols, filed on Aug. 8, 2002, now issued as U.S. Pat. No. 7,873,700 on Jan. 18, 2011. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
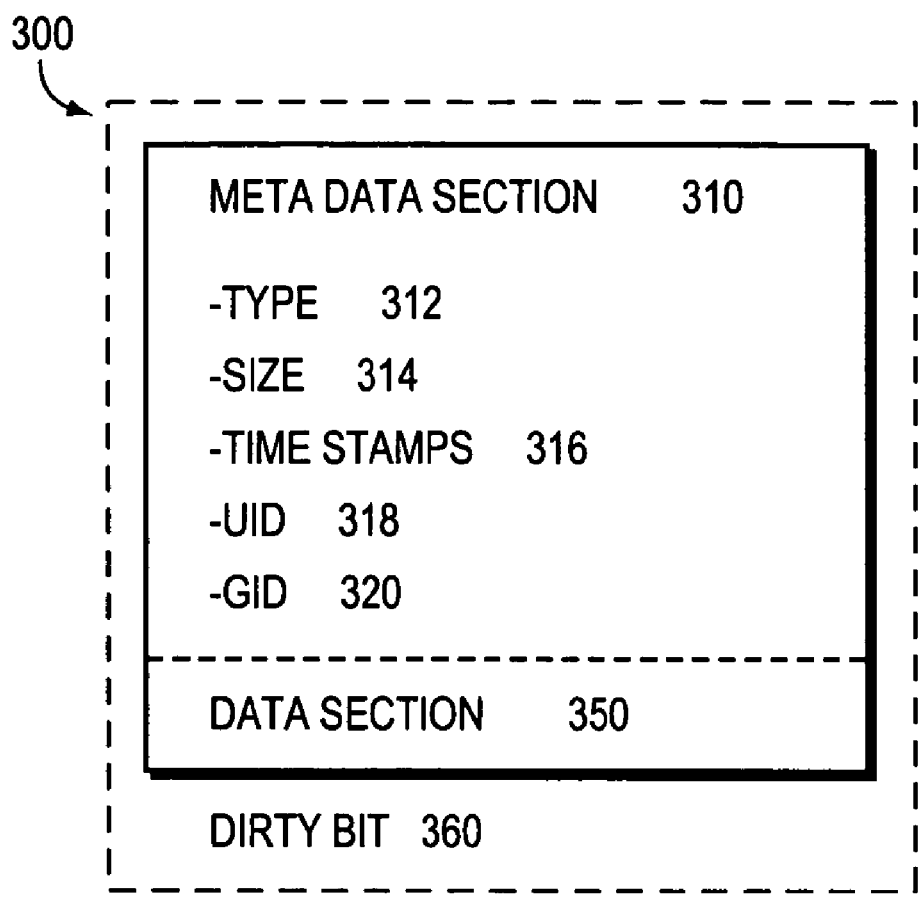
FIG. 3 is a schematic block diagram of an inode that may be advantageously used with the present invention.

In the illustrative embodiment, a file is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 includes a representation of the data associated with the file.

Specifically, the data section 350 of a regular on-disk inode may include file system data or pointers, the latter referencing 4 kB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 350 of the inode (e.g., a second level inode) references an indirect block (e.g., a first level block) that contains 1024 pointers, each of which references a 4 kB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 kB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 (FIG. 3) indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled Method for Maintaining Consistent States of a File System and for Creating User-Accessible Read-Only Copies of a File System by David Hitz et al., issued on Oct. 6, 1998.

Figure 4:
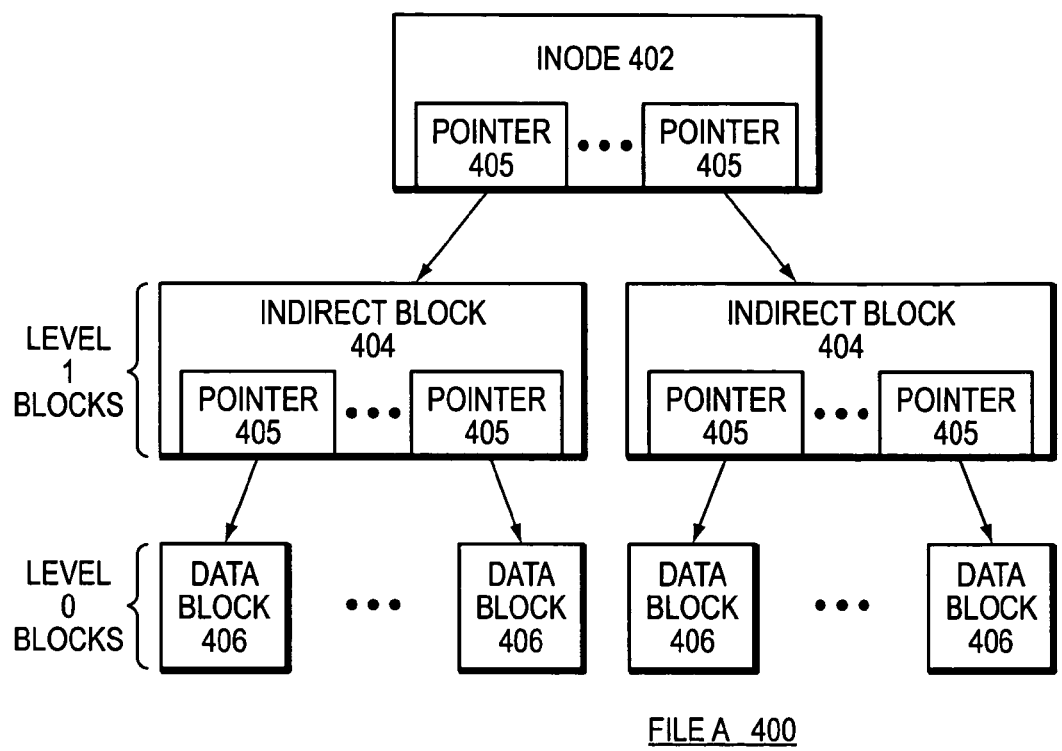
FIG. 4 is a schematic block diagram of a buffer tree of a file that may be advantageously used with the present invention.

FIG. 4 is a schematic block diagram of a buffer tree of a file that may be advantageously used with the present invention. The buffer tree is an internal representation of blocks for a file (e.g., file A 400) loaded into the buffer cache 170 and maintained by the write-anywhere file system 280. A root (top-level) inode 402, such as an embedded inode, references indirect (e.g., level 1) blocks 404. The indirect blocks (and inode) contain pointers 405 that ultimately reference data blocks 406 used to store the actual data of file A. That is, the data of file A 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

The present invention is directed to a write allocation technique that extends a conventional write allocation procedure employed by a write anywhere file system of a storage system. A write allocator of the file system implements the extended write allocation technique in response to an event in the file system (e.g., writing/updating of a file). The extended write allocation technique efficiently allocates blocks, and frees blocks, to and from a virtual volume (vvol) of an aggregate. The aggregate is a physical volume comprising one or more groups of disks, such as RAID groups, underlying one or more vvols of the storage system. The aggregate has its own physical volume block number (pvbn) space and maintains metadata, such as block allocation bitmap structures, within that pvbn space. Each vvol also has its own virtual volume block number (vvbn) space and maintains metadata, such as block allocation bitmap structures, within that vvbn space. The inventive technique extends I/O efficiencies of the conventional write allocation procedure to comport with an extended file system layout of the storage system.

In the illustrative embodiment, pvbns are used as block pointers within buffer trees of files (such as file 400) stored in a vvol. By utilizing pbvns (instead of vvbns) as block pointers within the buffer trees, the extended file system layout facilitates efficient read performance on read paths of those files. This illustrative "hybrid" vvol embodiment involves the insertion of only the pvbn in the parent indirect block (e.g., inode or volinfo block). Use of pvbns avoids latency associated with translations from vvbns-to-pvbns, e.g., when servicing file system (such as NFS, CIFS) requests. On a read path of a logical volume, a "logical" volume (vol) info block has a pointer that references an fsinfo block that, in turn, "points to" an inode file and its corresponding buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk,dbn occurs at the file system/RAID system boundary of the storage operating system 200.

In an alternate "dual vbn hybrid" vvol embodiment, both the pvbn and vvbn are inserted in the parent indirect (e.g., level 1) blocks in a buffer tree of a file. Here, the use of pvbns as block pointers in the indirect blocks provides efficiencies in the read paths, while the use of vvbn block pointers provides efficient access to required metadata, such as per-volume block allocation information. That is, when freeing a block of a file, the parent indirect block in the file contains readily available vvbn block pointers, which avoids the latency associated with accessing an owner map (described herein) to perform pvbn-to-vvbn translations; yet, on the read path, the pvbn is available. A disadvantage of this dual vbn variant is the increased size of indirection data (metadata) stored in each file.

Figure 5:
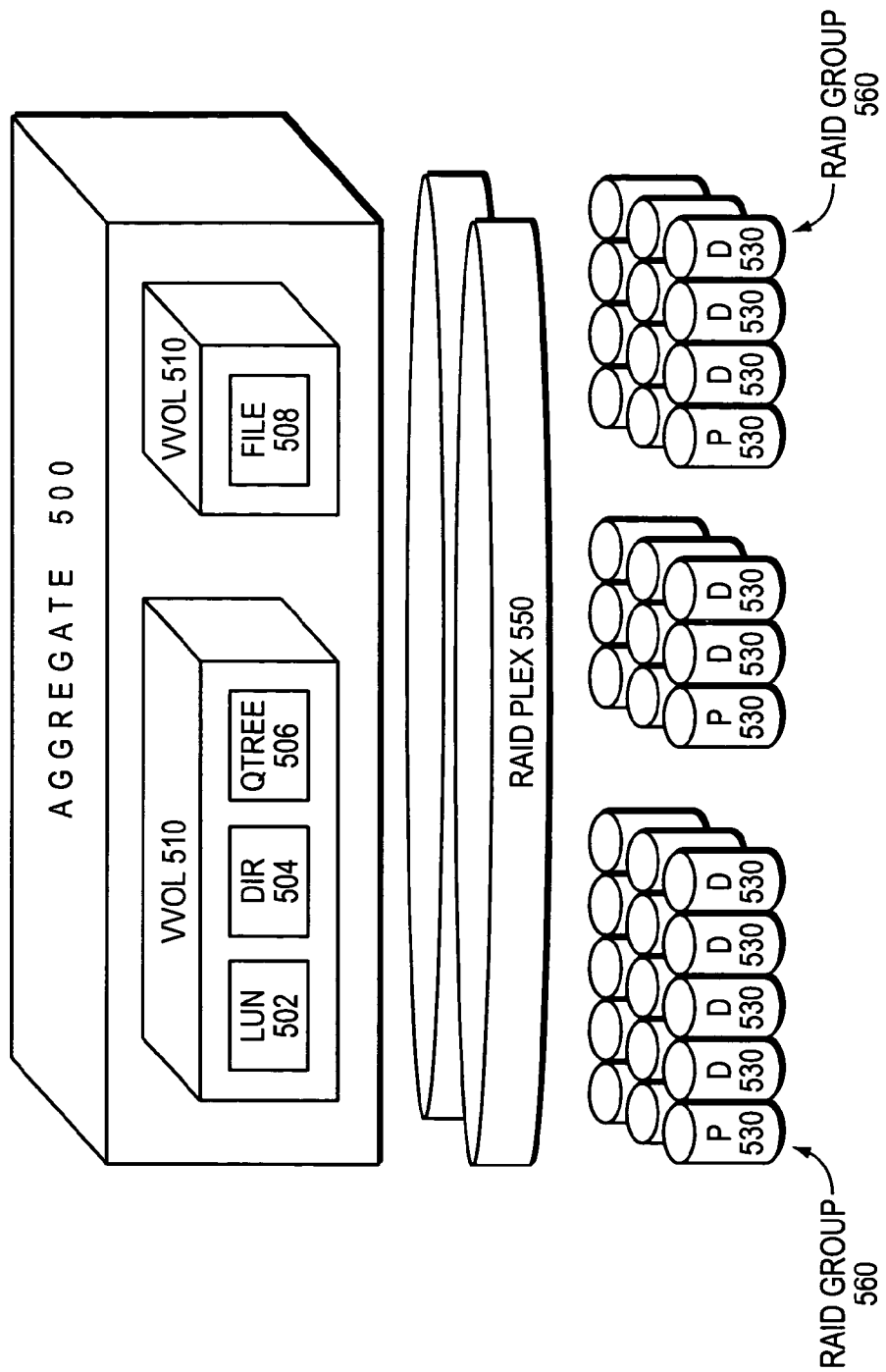
FIG. 5 is a schematic block diagram of an embodiment of an aggregate that may be advantageously used with the present invention.

FIG. 5 is a schematic block diagram of an embodiment of an aggregate 500 that may be advantageously used with the present invention. Luns (blocks) 502, directories 504, qtrees 506 and files 508 may be contained within vvols 510 that, in turn, are contained within the aggregate 500. The aggregate 500 is illustratively layered on top of the RAID system, which is represented by at least one RAID plex 550 (depending upon whether the storage configuration is mirrored), wherein each plex 550 comprises at least one RAID group 560. Each RAID group further comprises a plurality of disks 530, e.g., one or more data (D) disks and at least one (P) parity disk.

Whereas the aggregate 500 is analogous to a physical volume of a conventional storage system, a vvol is analogous to a file within that physical volume. That is, the aggregate 500 may include one or more files, wherein each file contains a vvol 510 and wherein the sum of the storage space consumed by the vvols is physically smaller than (or equal to) the size of the overall physical volume. The aggregate utilizes a "physical" pvbn space that defines a storage space of blocks provided by the disks of the physical volume, while each embedded vvol (within a file) utilizes a "logical" vvbn space to organize those blocks, e.g., as files. Each vvbn space is an independent set of numbers that corresponds to locations within the file, which locations are then translated to dbns on disks. Since the vvol 510 is also a logical volume, it has its own block allocation structures (e.g., active, space and summary maps) in its vvbn space.

Figure 6:
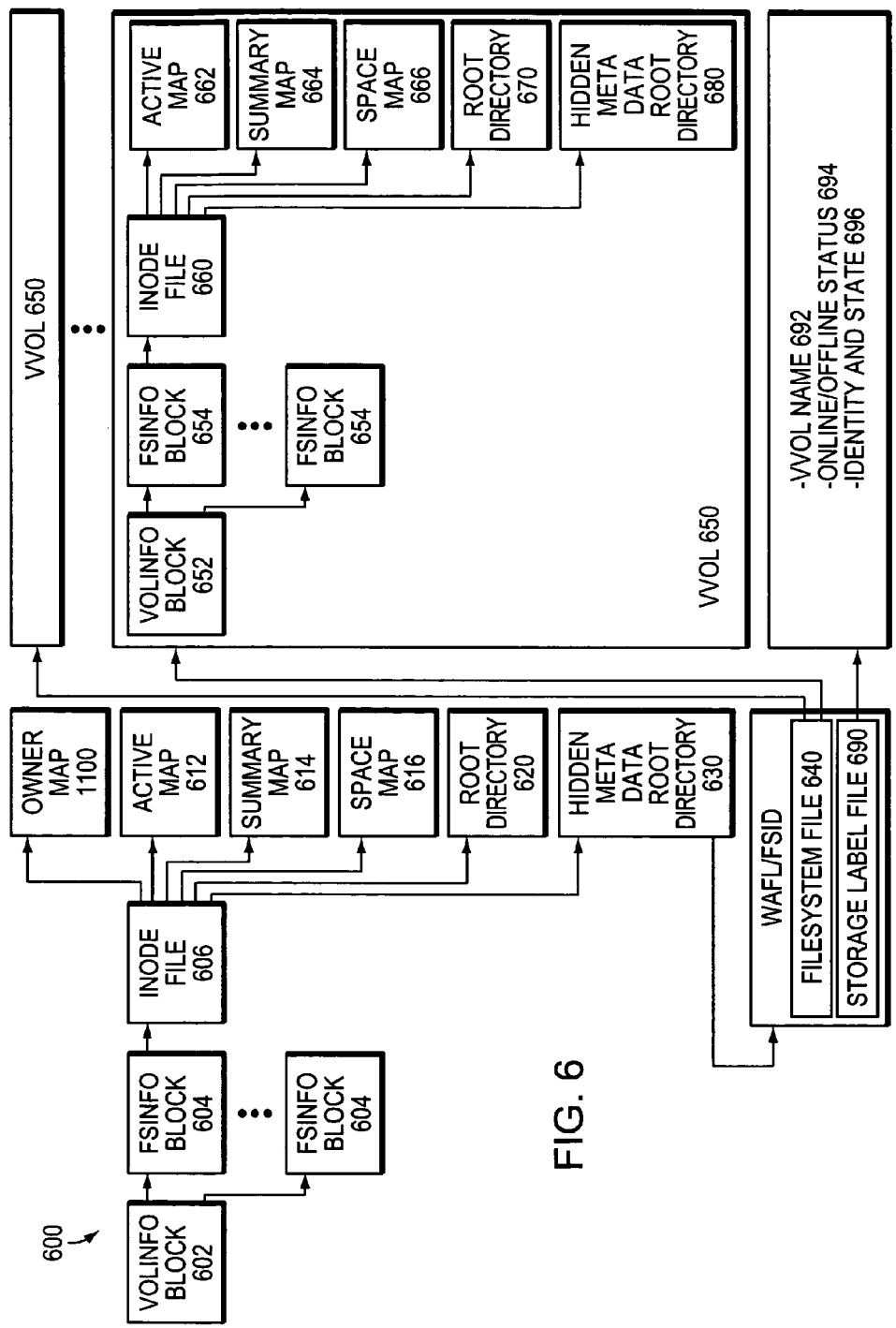
FIG. 6 is a schematic block diagram of an on-disk representation of an aggregate.

FIG. 6 is a schematic block diagram of an on-disk representation of an aggregate 600. The storage operating system 200, e.g., the RAID system 240, assembles a physical volume of pvbns to create the aggregate 600, with pvbns 1 and 2 comprising a "physical" volinfo block 602 for the aggregate. The volinfo block 602 contains block pointers to fsinfo blocks 604, each of which may represent a snapshot of the aggregate. Each fsinfo block 604 includes a block pointer to an inode file 606 that contains inodes of a plurality of files, including an owner map 1100, an active map 612, a summary map 614 and a space map 616, as well as other special metadata files. The inode file 606 further includes a root directory 620 and a "hidden" metadata root directory 630, the latter of which includes a namespace having files related to a vvol in which users cannot "see" the files. The hidden metadata root directory also includes a WAFL/fsid/directory structure, as described herein, which contains a filesystem file 640 and storage label file 690. Note that root directory 620 in the aggregate is empty; all files related to the aggregate are organized within the hidden metadata root directory 630.

The filesystem file 640 includes block pointers that reference various file systems embodied as vvols 650. The aggregate 600 maintains these vvols 650 at special reserved inode numbers. Each vvol 650 also has special reserved inode numbers within its vvol space that are used for, among other things, the block allocation bitmap structures. As noted, the block allocation bitmap structures, e.g., active map 662, summary map 664 and space map 666, are located in each vvol.

Specifically, each vvol 650 has the same inode file structure/content as the aggregate, with the exception that there is no owner map and no WAFL/fsid/filesystem file, storage label file directory structure in a hidden metadata root directory 680. To that end, each vvol 650 has a volinfo block 652 that points to one or more fsinfo blocks 654, each of which may represent a snapshot of the vvol. Each fsinfo block, in turn, points to an inode file 660 that, as noted, has the same inode structure/content as the aggregate with the exceptions noted above. Each vvol 650 has its own inode file 660 and distinct inode space with corresponding inode numbers, as well as its own root (fsid) directory 670 and subdirectories of files that can be exported separately from other vvols.

The storage label file 690 contained within the hidden metadata root directory 630 of the aggregate is a small file that functions as an analog to a conventional raid label. A raid label includes "physical" information about the storage system, such as the volume name; that information is loaded into the storage label file 690. Illustratively, the storage label file 690 includes the name 692 of the associated vvol 650, the online/offline status 694 of the vvol, and other identity and state information 696 of the associated vvol (whether it is in the process of being created or destroyed).

Figure 7:
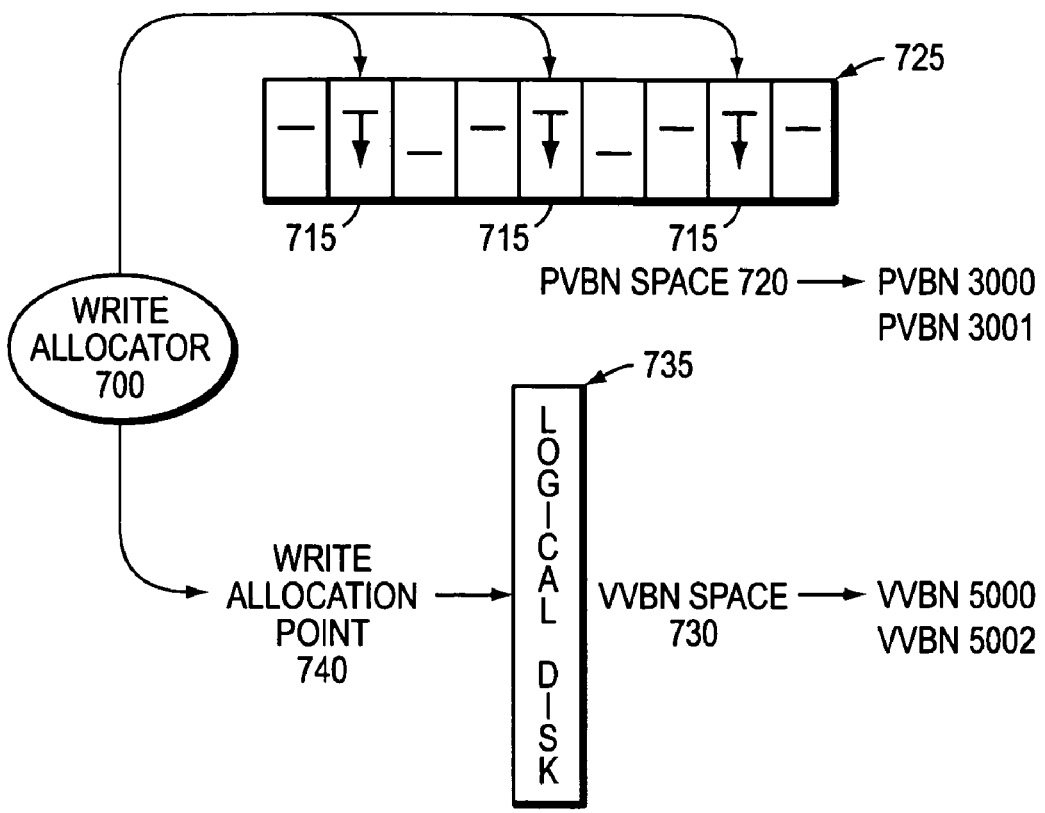
FIG. 7 is a functional block diagram of a write allocator configured to implement an extended write allocation technique of the present invention.

According to an aspect of the extended write allocation technique, block allocation proceeds (is performed) in parallel on the vvol and the aggregate when write allocating a block within the vvol, with the write allocator independently selecting a pvbn in the aggregate and a vvbn in the vvol. In essence, the write allocator 700 moves down physical disks of a RAID group and a logical disk of each vvol in parallel, selecting a pvbn and a vvbn for each write allocated block. FIG. 7 is a functional block diagram of a write allocator 700 configured to implement the extended write allocation technique of the present invention. The write allocator maintains a pvbn space 720 and vvbn space 730 in accordance with the inventive technique. The write allocator selects a pvbn for the file by selecting a disk 715 of a RAID group 725 that is "farthest back" (from the last stripe), scanning that disk a certain depth and selecting all free blocks. The write allocator then moves to a next disk in the RAID group and performs the same procedure.

When selecting a vvbn, the file system views the vvbn space of a vvol as a large "logical" disk 735, since the vvbn space 730 does not relate to the physical properties of the disks within RAID group 725. The file system references a write allocation point 740 in the logical disk 735 to select a vvbn from the vvbn space 730 of the vvol. For each disk of a vvol, the file system constructs write allocations blocks (buffers) that are used at the write allocation point 740. By treating the vvbn space as a large logical disk, only one write allocation point is needed within the vvol, thereby limiting the number of write allocation buffers that need to be written.

As described further herein, the write allocator adjusts the block allocation bitmap structures, such the active map 612 and space map 616, of the aggregate to record the selected pvbn and adjusts the active and space map structures 662, 666 of the vvol to record the selected vvbn. A virtual volume identifier (vvid) and the vvbn are inserted into the owner map 1100 of the aggregate at an entry defined by the pvbn to record use of the pvbn. It should be noted that in the dual vbn hybrid embodiment, there is no requirement for the owner map and, thus, updates of the owner map for the vvid and vvbn can be avoided. That pvbn is also inserted into a container map 950 of the vvol. Finally, an indirect block or inode file parent of the allocated block is updated with a block pointer to the allocated block. The content of the update operation depends on the vvol embodiment. For a hybrid vvol embodiment, the pvbn is inserted in the parent indirect block (e.g., inode or volinfo block). However, for a dual vbn hybrid vvol embodiment, both the pvbn and vvbn are inserted in the indirect block.

Specifically, when write allocating a block in a file of the aggregate (e.g., a container file, a storage label file or active/summary/owner map files), only the aggregate's bitmaps and buffers are used and affected. The write allocator 700 selects a pvbn, marks the corresponding bits in the active map 612 of the aggregate as "in use" and places the pvbn into a parent (indirect block or inode) of the block being write allocated. Direct allocation of the container file occurs when write allocating the volinfo block 652 of the vvol; such direct allocation is analogous to direct write operations to the RAID system. When write allocating a block of a vvol, however, the write allocator selects (i) a pvbn in the aggregate (a "physical" block on disk) for storing data of the allocated block and (ii) a vvbn (a "logical" block) in the vvol for enabling logical operations, such as a snapshot, on the data of the block.

Figure 8:
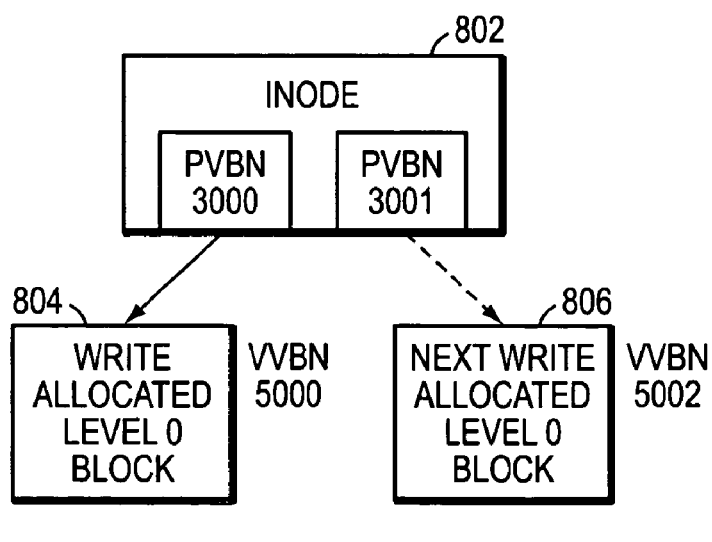
FIG. 8 is a schematic block diagram of a partial buffer tree of a file that may be advantageously used with the present invention.

FIG. 8 is a schematic block diagram of a partial buffer tree of a file 800 that may be advantageously used with the present invention. Assume pvbn 3000 is selected for a write allocated (level 0) block 804 of the file 800. Assume also that vvbn 5000 is selected as the logical pointer associated with the physical pointer pvbn 3000 for the new write allocated block 804. A next write allocated (level 0) block 806 in the file may be assigned pvbn 3001 and vvbn 5002. For the illustrative hybrid vvol embodiment, the write allocator 700 inserts the pvbns into the parent blocks of the write allocated blocks, whereas for the alternate dual vbn hybrid vvol embodiment, the write allocator inserts both the pvbns and vvbns into the parent blocks. Note that a parent block may comprise indirect block of a file, an inode 802 of the file, or a volinfo block of a write allocated fsinfo block of, e.g., a vvol.

Figure 9:
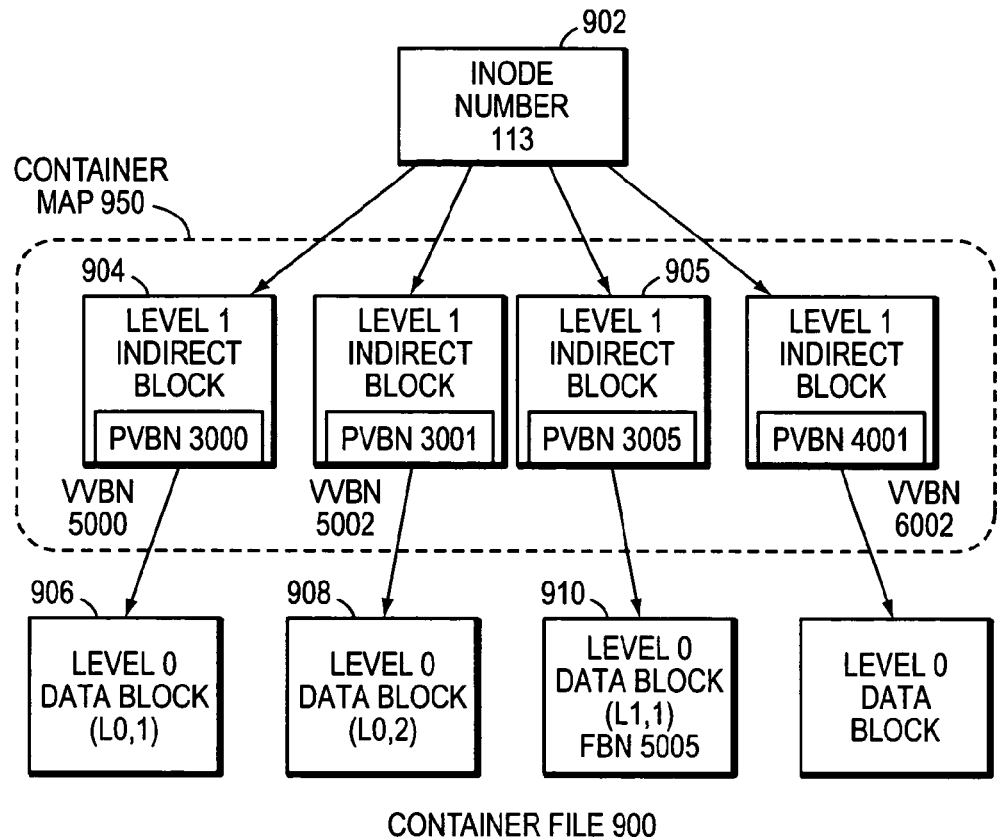
FIG. 9 is a schematic block diagram of a container file that may be advantageously used with the present invention.

FIG. 9 is a schematic block diagram illustrating a vvol embodied as container file 900. The container file is a file in the aggregate having level 0 (data) blocks that comprise all blocks used to hold data in a vvol; that is, the level 0 data blocks of the container file contain all blocks used by a vvol. Level 1 (and higher) indirect blocks of the container file reside in the aggregate and, as such, are considered aggregate blocks. The container file is an internal (to the aggregate) feature that supports a vvol; illustratively, there is one container file per vvol. The container file is a hidden file (not accessible to a user) in the aggregate that holds every block in use by the vvol. When operating in a vvol, a vvbn identifies a file block number (fbn) location within the file and the file system uses the indirect blocks of the hidden container file to translate the fbn into a physical vbn (pvbn) location within the physical volume, which block can then be retrieved from disk. As noted, the aggregate includes the illustrative hidden metadata root directory 630 that contains subdirectories of vvols:

WAFL/fsid/filesystem file, storage label file

A "physical" file system (WAFL) directory includes a subdirectory for each vvol in the aggregate, with the name of subdirectory being a file system identifier (fsid) of the vvol. As further noted, each fsid subdirectory (vvol) has at least two files, a filesystem file 640 and a storage label file 690. The storage label file 690 is illustratively a 4 kB file that contains metadata similar to that stored in a conventional raid label. In other words, the storage label file is the analog of a raid label and, as such, contains information about the state of the vvol such as, e.g., the name of the vvol, a universal unique identifier (uuid) and fsid of the vvol, whether it is online, being created or being destroyed, etc.

The filesystem file 640 is a large sparse file that contains all blocks owned by a vvol and, as such, is referred to as the container file for the vvol. The container file 900 is assigned a new type and has an inode 902 that is assigned an inode number equal to a vvid of the vvol, e.g., container file 900 has an inode number 113. The container file is essentially one large, sparse virtual disk and, since it contains all blocks owned by its vvol, a block with vvbn X in the vvol can be found at fbn X in the container file. For example, vvbn 5005 in a vvol can be found at fbn 5005 in its container file 900.

Figure 10:
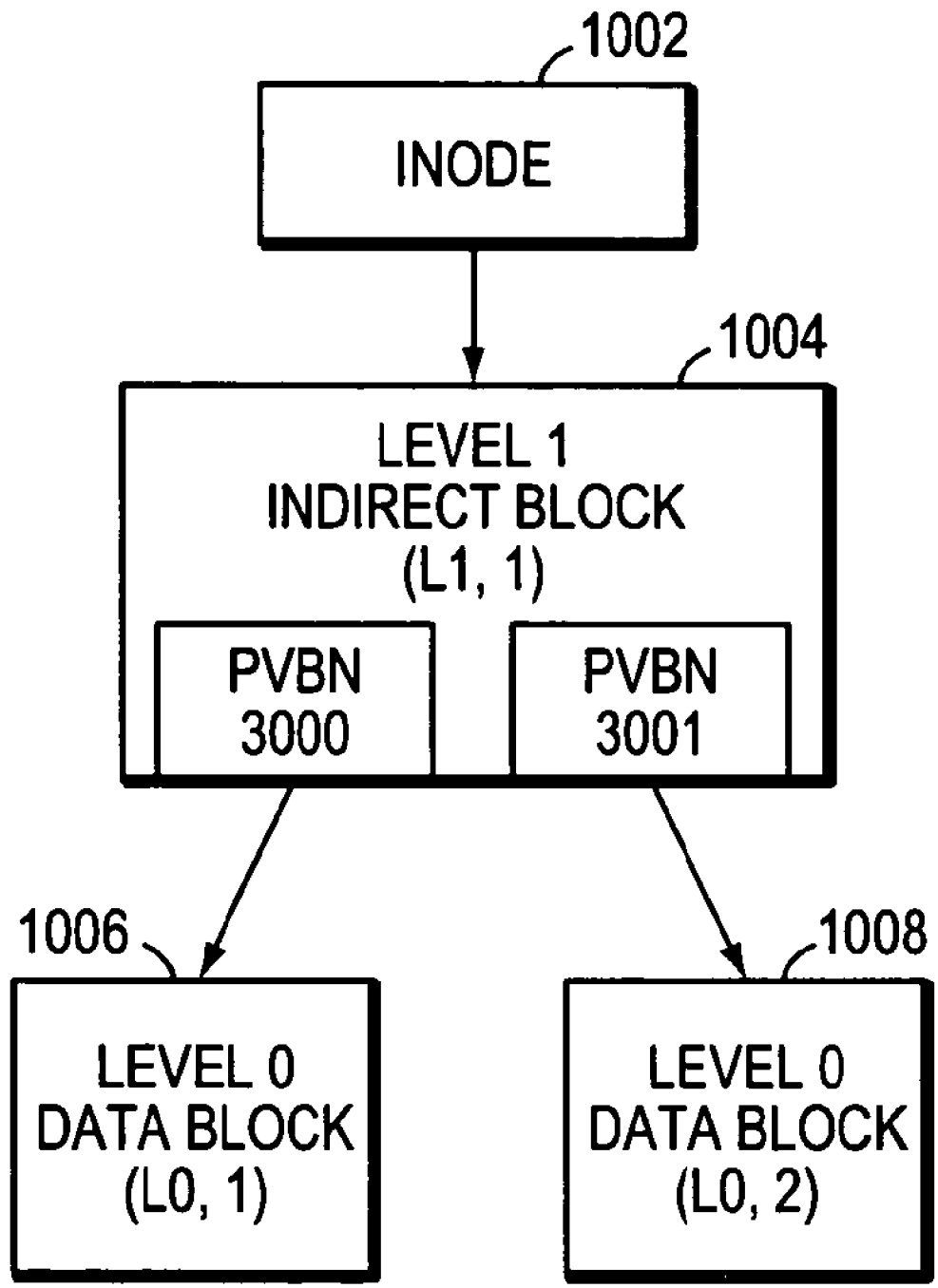
FIG. 10 is a schematic block diagram of a partial buffer tree of a file within a virtual volume (vvol) of the aggregate that may be advantageously used with the present invention.

FIG. 10 is a schematic block diagram of a partial buffer tree of a file 1000 within a vvol of the aggregate that may be advantageously used with the present invention. The buffer tree includes a top-level inode 1002 that has a block pointer to a level 1 indirect block (L1,1) 1004 which, in turn, has block pointers that reference level 0 blocks (L0,1) 1006 and (L0,2) 1008. Note that in the hybrid vvol embodiment, the block pointers comprise pvbns (as illustrated), whereas in the dual vbn hybrid vvol embodiment the block pointers comprise pvbn,vvbn pairs. All of the blocks of the buffer tree, including the level 1 (L1) and level 0 (L0) blocks of the file 1000, as well as all inode file blocks, fsinfo blocks and volinfo blocks in a vvol, are located within level 0 blocks of the corresponding container file 900. For example, the level 0 blocks 906-910 of the container file 900 hold (L0,1), (L0,2), and (L1,1), respectively.

Assume that level 0 block 910 of the container file 900 has an fbn 5005 and a "parent" indirect (level 1) block 905 of that level 0 block has a block pointer referencing the level 0 block, wherein the block pointer has a pvbn 3005. Thus, location fbn 5005 of the container file 900 is pvbn 3005 (on disk). Notably, the block numbers are maintained at the first indirect level (level 1) of the container file 900; e.g., to locate block 5005 in the container file, the file system layer accesses the 5005$^{th}$ entry at level 1 of the container file and that indirect block provides the pvbn 3005 for fbn 5005.

In other words, level 1 indirect blocks 904, 905 of the container file 900 contain the pvbns for blocks in the file and, thus, provides a "forward" mapping of vvbns of a vvol to pvbns of the aggregate. The level 1 indirect blocks of the container file 900 are thus configured as a container map 950 for the vvol; there is preferably one container map 950 per vvol. Specifically, the container map provides block pointers from fbn locations within the container file to pvbn locations on disk. Furthermore, there is a one-to-one correspondence between fbn locations in the container file and vvbn locations in a vvol; this allows applications that need to access the vvol to find blocks on disk via the vvbn space. Accordingly, the write allocator inserts pvbn 3000 at block location (vvbn) 5000 of the container map 950 for the vvol and pvbn 3001 at block location (vvbn) 5002 of that map.

Each vvol has its own vvbn space that contains its own version of all file system metadata files, including block allocation (bitmap) structures that are sized to that space. As noted, the indirect blocks of files within a vvol illustratively contain pvbns in the underlying aggregate rather than (or in addition to) vvbns. For example, when updating/modifying data (i.e., "dirtying") of an "old" block in a file during write allocation, the file system selects a new block and frees the old block, which involves clearing bits of the block allocation bitmaps for the old block in the logical volume's vbn (now pvbn) space. In essence, the file system 280 only knows that a particular physical block (pvbn) has been dirtied. However, freeing blocks within the vvol requires use of a vvbn to clear the appropriate bits in the vvbn-oriented block allocation files. Therefore, in the absence of a vvbn, a "backward" mapping (pvbn-to-vvbn) mechanism is needed at the aggregate level.

Figure 11:
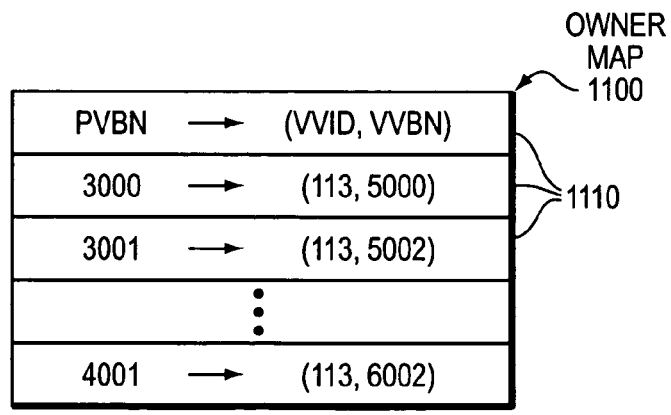
FIG. 11 is a schematic block diagram of an owner map that may be advantageously used with the present invention.

In the illustrative embodiment, mapping metadata provides a backward mapping between each pvbn in the aggregate to (i) a vvid that "owns" the pvbn and (ii) the vvbn of the vvol in which the pvbn is located. The backward mapping metadata is preferably sized to the pvbn space of the aggregate; this does not present a scalability concern, since the mapping metadata for each vvol can be interleaved into a single file, referred to as an owner map 1100, in the aggregate. FIG. 11 is a schematic block diagram of an owner map 1100 that may be advantageously used with the present invention. The owner map 1100 may be embodied as a data structure having a plurality of entries 1110; there is preferably one entry 1110 for each block in the aggregate.

In the illustrative embodiment, each entry 1110 has a 4-byte vvid and a 4-byte vvbn, and is indexed by a pvbn. That is, for a given block in the aggregate, the owner entry 1110 indicates which vvol owns the block and which pvbn it maps to in the vvbn space. As such, the write allocator inserts (vvid 113, vvbn 5000) at entry pvbvn 3000 of the owner map 1100. In addition, the write allocator inserts (vvid 113, vvbn 5002) at entry pvbn 3001 of the owner map 1100. Thus when indexing into the owner map 1100 at pvbn 3000, the file system 280 accesses a vvol having an inode 113 (which is container file 900) and then accesses block location 5000 within that file. Each entry 1110 of the owner map 1100 is only valid for blocks that are in use; therefore, updates to the owner map are optimized to occur at a write allocation point. In general, a vvol only owns those blocks used in the contained file system. There may be situations where the vvol owns blocks the contained file system is not using. Allocated blocks that are not owned by any vvol illustratively have owner map entries (0, 0).

Figure 12:
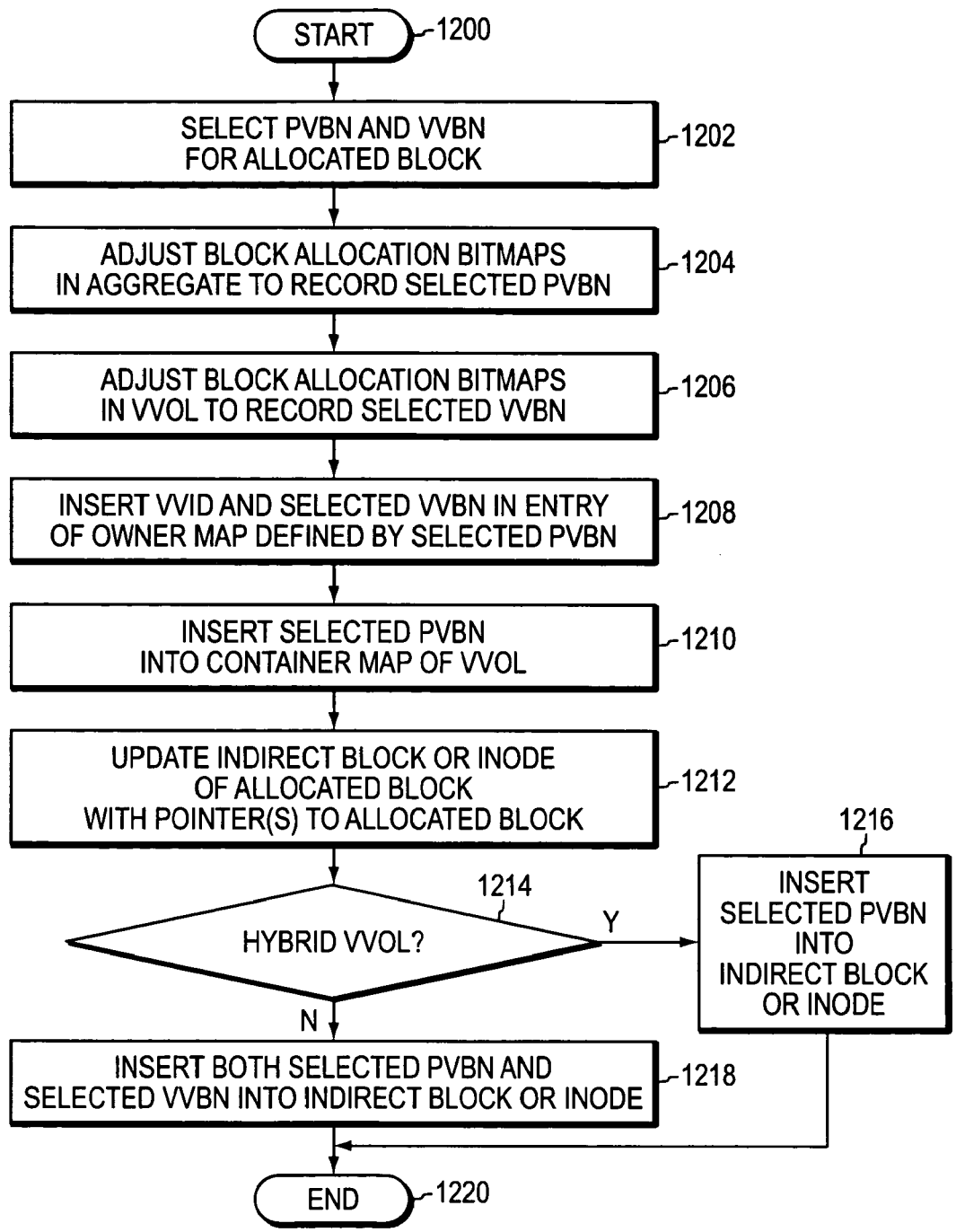
FIG. 12 is a flowchart illustrating a sequence of steps directed to allocating a block within a vvol in accordance with the extended write allocation technique of the present invention.

FIG. 12 is a flowchart illustrating a sequence of steps directed to allocating a block within a vvol in accordance with the extended write allocation technique of the present invention. According to the technique, block allocation is preferably performed in parallel on the vvol and the aggregate. The sequence starts at Step 1200 and proceeds to Step 1202 where the write allocator selects a pvbn in the aggregate and a vvbn in the vvol, as described above. In Step 1204, the write allocator adjusts the block allocation bitmap structures, such active map 612 and space map 616, of the aggregate to record the selected pvbn and, in Step 1206, adjusts similar bitmap structures 662, 666 of the vvol to record the selected vvbn. In Step 1208, the write allocator inserts a vvid of the vvol and the vvbn into the owner map 1100 of the aggregate at an entry defined by the pvbn. Note that in the dual vbn hybrid embodiment, there is no requirement for the owner map and, thus, the insertions to the owner map (Step 1208) may be eliminated/avoided. In Step 1210, the write allocator inserts the pvbn into the container map 950 of the vvol. In Step 1212, the write allocator updates an indirect block or inode file parent of the allocated block with block pointer(s) to the allocated block, wherein the content of the update operation depends on the type of vvol. Specifically, in Step 1214, a determination is made as to whether the vvol is a hybrid vvol. If so, the pvbn is inserted in the indirect block or inode as a block pointer in Step 1216. If not, the vvol is a dual vbn hybrid and, as such, both the pvbn and vvbn are inserted in the indirect block or inode as block pointers in Step 1218. The sequence then ends at Step 1220.

Another aspect of the present invention involves freeing of a block. When freeing a block of the hybrid vvol embodiment, the applicable vbn is the pvbn of the aggregate. The write allocator 700 locates the container map entry for the block and uses it to find the corresponding vvbn. The write allocator then loads the active, summary and space map buffers for both the pvbns and vvbns, and loads the owner map entry. The allocator 700 clears the active map block of the vvol, checks the summary map and adjusts the space map if the block is freed. This, in turn, requires clearing of the container entry and the active map in the aggregate, examining of the summary map and adjusting of the space map, if necessary.

Assume block (pvbn 3001, vvbn 5002) of a dual vbn hybrid vvol embodiment is dirtied and is prepared for subsequent write allocation. When dirtying (overwriting) a block, the file system 280 frees the old block and writes to a new block. At a next consistency point, the write allocator selects a new pvbn (e.g., 4001) and a new vvbn (e.g., 6002), as described above. The write allocator frees the dirty block using the container map 950 and owner map 1100, the latter enabling pvbn-to-vvbn translation.

Broadly stated, the write allocator accesses the owner map 1100 at pvbn 3001 to obtain vvid 113 (the inode number of the container file 300) and the appropriate vvbn 5002 (the fbn location within the container file). The allocator 700 clears bit 5002 in the active map for the vvol and examines the summary map of the vvol to determine the state of bit 5002. If that bit is also cleared in the summary map, then vvbn block 5002 is totally free in the vvol (not used in any snapshot) and may be released from the container file 900 and returned to the aggregate. Note that the vvol (container file 900) may choose to keep that block within its vvbn space instead of returning it to the aggregate. However, if the bit is set in the summary map, block 5002 is still used in at least one snapshot and the container file "holds on" to that block at the vvol level.

Assuming vvbn block 5002 is totally free, the write allocator clears block vvbn 5002, pvbn 3001 in the container map 950. The allocator accesses the level 1 blocks of the container file (the container map 950) using the size of the container file (vvol) to compute the levels of indirection needed in the file. The write allocator also clears the corresponding bits in the active/summary maps of the aggregate to return block pvbn 3001 to the aggregate; otherwise, the allocator could delay this action. In any event, the write allocator inserts new pvbn 4001 into vvbn block 6002 of the container map and loads entry pvbn 4001 with (vvid 113, vvbn 6002) in the owner map.

Figure 13:
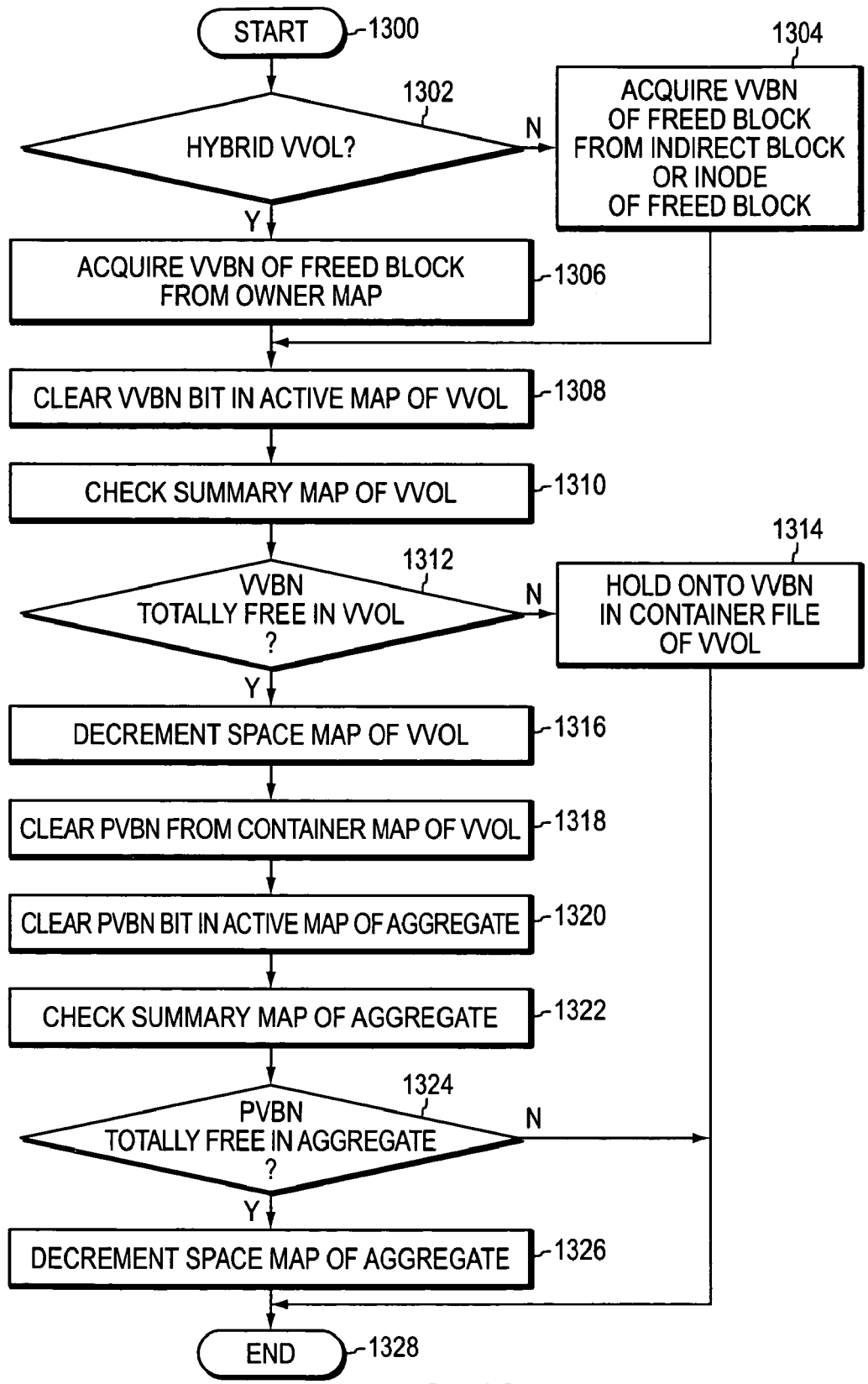
FIG. 13 is a flowchart illustrating a sequence of steps directed to freeing a block in accordance with the extended write allocation technique of the present invention.

FIG. 13 is a flowchart illustrating a sequence of steps directed to freeing a block in accordance with the extended write allocation technique of the present invention. The sequence starts at Step 1300 and proceeds to Step 1302 where a determination is made as to whether the vvol is a hybrid vvol. If not, the write allocator acquires the vvbn of the freed block directly from the indirect block or inode file patent of the freed block in Step 1304. However, if the vvol is a hybrid vvol, only the pvbn is available in the indirect block or inode file parent of the freed block; accordingly, the write allocator accesses the owner map 1100 of the aggregate to acquire the vvbn in Step 1306. The write allocator uses the acquired vvbn to clear a bit entry of the vvol active map 662 for the vvbn in Step 1308 and, in Step 1310, to check the appropriate bit entry of the vvol summary map 664 for the vvbn to determine whether the vvbn is totally free in the vvol. If the vvbn is not totally free, e.g., the bit entry is not cleared, (Step 1312), the container file holds on to (retains) that vvbn block at the vvol level in Step 1314 and the sequence ends at Step 1328.

However, if the vvbn is totally free in the vvol, e.g., the bit entry of the vvol summary map is cleared, the block may also be "freed" for return to the aggregate. In Step 1316, the write allocator decrements the space map 666 of the vvol and, in Step 1318, clears the pvbn of the freed block from the container map 950 (at entry vvbn of the freed block) of vvol to thereby free (release) the freed block from the vvol. In Step 1320, the allocator 700 clears the appropriate pvbn bit entry of the aggregate active map 612 and, in Step 1322, checks the appropriate entry of the aggregate summary map 614 for the pvbn to determine whether the pvbn is totally free. If the pvbn is not totally free, e.g., the bit entry is not cleared, (Step 1324), the sequence ends at Step 1328. However, if the pvbn is totally free, e.g., the bit entry is cleared, the write allocator decrements the aggregate space map 666 in Step 1326 and the sequence ends at Step 1328.

In an aspect of the inventive technique, the file system 280 may perform a "delayed free" operation from the vvol that essentially delays release of a free block from a vvol to the aggregate. In the illustrative embodiment, the file system decides whether to do a delayed free operation when it is preparing to free the block within the vvol. Releasing of freed blocks from a vvol may be delayed to allow amortization of the cost among many accumulated update operations. The decision as to whether to release the free block depends on how many delayed free block operations are pending and how much free space is available in the aggregate. The number of delayed free operations from the container file is maintained in the storage label file for the vvol.

If the delayed free operation is not performed, the file system frees the block within the vvol, but leaves the block as owned by the vvol within the aggregate. If the delayed free operation is performed, the file system clears appropriate block allocation bitmaps in the vvol, but delays clearing of the container map 950 of the vvol and block allocation bitmaps of the aggregate. When a sufficient number of free blocks have been accumulated for the vvol (or portion of the vvol) all of the accumulated blocks may be freed from a block of the container map at once. In general, it is efficient to free all accumulated unused blocks from a container map block at a time.

A space map style optimization may be applied to the container map 950 of the vvol to keep track of "rich" areas for delayed free operations to improve the efficiency of these operations. The space map style optimization indicates how many delayed frees are in different regions of the vvol. When clearing blocks of a vvol from the container map, a further optimization involves not freeing the blocks in the aggregate immediately, but rather accumulating them into a delete log file in the aggregate. When a sufficient number of free blocks are accumulated, they may be sorted and freed in block order. This optimization minimizes the number of I/O operations associated with the container map and block allocation bitmaps of the aggregate.

In sum, the extended write allocation technique described herein has a number of novel features. By write allocating at a write allocation point of disks within a RAID group, the present technique realizes RAID efficiencies because blocks are selected within a stripe and all write block allocations occur within a few active map blocks. This results in a concentrated area of bits being set in the active map blocks, e.g., a plurality of bits is set in an active map block on each disk. Thus, relatively little metadata is dirtied to perform write allocation. In particular, the present technique dirties metadata blocks in a narrow span of the active map; update operations to the owner map 1100 of the aggregate are also concentrated, according to a feature of the present technique. Note that the owner map is changed only during write allocation. When freeing a block, a "stale" entry/value is left in the owner map.

While there has been shown and described illustrative embodiments of a write allocation technique that extends a conventional write allocation procedure employed by a write anywhere file system of a storage system, it is to be understood that various other adaptations and modifications may be made within the spirit and scope of the invention. For example, an alternate embodiment of the invention is directed to "paired volume" write allocation. In the paired volume embodiment, the value of the vvbn is always equal to the value of the pvbn, e.g., pvbn 20 in an indirect block has a vvbn 20. In other words, a vvol may be maintained so that its vvbns map to similar pvbns (e.g., vvbn 28383=pvbn 28383). This embodiment improves write allocation efficiency, since the file system 280 only needs to choose a pvbn for the new block and use that pvbn value for the vvbn. The paired volume embodiment thus obviates the need to translate a pvbn to a vvbn using the owner map 1100 since they are the same value. However, all of the data in a vvol is updated at the write allocation point of the disks and the block allocation data for the vvol must be the same size as the aggregate, impacting snapshot performance for the vvol.

The paired volume embodiment is particularly useful for upgrade and revert operations, i.e., allowing reversion back to an old version of the file system. To revert, the volinfo block (e.g., block 1 in the container file) is "stomped into" the volinfo block of the aggregate, thereby creating a reverted vvol. An upgrade involves moving pvbns of a vvol to the container file and constructing a new aggregate under that container file. By maintaining pvbn values equal to vvbn values, all indirect blocks in the container file include pvbns and all block allocation bit maps are in synchronization with the vvbn space since that space corresponds directly to the pvbn space. Therefore, the block allocation bitmaps that specify which blocks are in use are synchronized to the information stored in the indirect blocks (pvbns).

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for performing write-allocation in a storage system, comprising:
    maintaining a plurality of virtual volumes (vvols) by the storage system;
    selecting a physical volume block number (pvbn) for a data block from a pvbn space of an aggregate, where the aggregate is a physical volume formed from one or more groups of storage devices coupled to the storage system and organized into a global storage space, the data block resident on one of the storage devices;
    selecting a virtual volume of the plurality of virtual volumes (vvol) having a selected virtual volume identification (vvid), and selecting a virtual volume block number (vvbn) for the data block from a vvbn space of the selected vvol to allocate the data block (the allocated data block) to the selected vvol;
    adjusting a first block allocation bitmap structure of the aggregate to record the selected pvbn;
    adjusting a second block allocation bitmap structure of the vvol to record the selected vvbn;
    inserting both the selected pvbn and the selected vvbn in a parent block as block pointers to point to the allocated data block on the storage device; and
    maintaining an existing data block after writing to the allocated block a change directed to data of the existing data block, the existing data block maintained to support a persistent consistent point image of the file system.

2. The method as in claim 1, further comprising:
    using an inode block as the parent block.

3. The method as in claim 1, further comprising:
    using a level 1 indirect block as the parent block..

4. The method as in claim 1, further comprising:
    freeing an existing data block after allocating the data block.

5. The method as in claim 1, further comprising:
    performing the selecting the pvbn and the selecting the vvbn in parallel.

6. The method as in claim 1, further comprising:
    inserting the vvid and the vvbn and the pvbn into an owner map to facilitate tracing ownership of the data block referenced by the pvbn.

7. The method as in claim 1, further comprising:
    using a magnetic storage disk as the storage device.

8. The method as in claim 1, further comprising:
    using a RAID array of magnetic storage disks as the storage device.

9. The method as in claim 1, further comprising:
    using an optical storage device as the storage device.

10. The method as in claim 1, further comprising:
    using an electronic random access memory as the storage device.

11. The method as in claim 1, further comprising: using an electronic memory as the storage device.

12. The method as in claim 1, further comprising:
    using a micro-electro mechanical device as the storage device.

13. The method as in claim 1, further comprising:
    allocating the data block in response to changing data written into an existing data block, the data block to hold a new data and the existing data block to remain on the storage device.

14. The method as in claim 1, further comprising:
    allocating the data block in a write anywhere file system.

15. A storage system, comprising:
    a plurality of virtual volumes (vvols) in the storage system;
    a write allocator to allocate a data block to a virtual volume of the plurality of virtual volumes having,
    a selected physical volume block number (pvbn) for the data block from a pvbn space of an aggregate, where the aggregate is a physical volume formed from one or more groups of storage devices coupled to the storage system and organized into a global storage space, and the data block is resident on one of the storage devices;
    a selected virtual volume of the plurality of virtual volumes (vvol) having a selected virtual volume identification (vvid), and a selected virtual volume block number (vvbn) for the data block from a vvbn space of the selected vvol to allocate the data block (the allocated data block) to the selected vvol;
    a first block allocation bitmap structure of the aggregate adjusted to record the selected pvbn;
    a second block allocation bitmap structure of the vvol adjusted to record the selected vvbn;
    a parent block containing the selected pvbn and the selected vvbn as block pointers to point to the allocated data block on the storage device; and
    an existing data block maintained after writing to the allocated data block a change directed to data of the existing data block, the existing data block maintained to support a persistent consistent point image of the file system.

16. The storage system as in claim 15, further comprising:
    an inode block used as the parent block.

17. The storage system as in claim 15, further comprising:
    a level 1 indirect block used as the parent block.

18. The storage system as in claim 15, further comprising:
an operating system configured to free an existing data block after the data block is allocated.

19. The storage system as in claim 15, further comprising:
the selecting the pvbn and the selecting the vvbn performed in parallel.

20. The storage system as in claim 15, further comprising:
an owner map containing the vvid and the vvbn and the pvbn to facilitate tracing ownership of the data block referenced by the pvbn.

21. The storage system as in claim 15, further comprising:
a magnetic storage disk used as the storage device.

22. The storage system as in claim 15, further comprising:
a RAID array of magnetic storage disks used as the storage device.

23. The storage system as in claim 15, further comprising:
an electronic random access memory used as the storage device.

24. The storage system as in claim 15, further comprising:
an electronic random access memory used as the storage device.

25. The storage system as in claim 15, further comprising:
an electronic memory used as the storage device.

26. The storage system as in claim 15, further comprising:
a micro-electro mechanical device used as the storage device.

27. The storage system as in claim 15, further comprising:
the data block allocated in response to changing data written into an existing data block, the data block to hold a new data and the existing data block to remain on the storage device.

28. The storage system as in claim 15, further comprising:
the data block allocated in a write anywhere file system.

29. A computer readable storage media, comprising:
said computer readable storage media containing program instructions for execution on a processor for a method of performing write-allocation in a storage system, the program instructions,
   maintaining a plurality of virtual volumes (vvols) by the storage system;
   selecting a physical volume block number (pvbn) for a data block from a pvbn space of an aggregate, where the aggregate is a physical volume formed from one or more groups of storage devices coupled to the storage system and organized into a global storage space, the data block resident on one of the storage devices;
   selecting a virtual volume of the plurality of virtual volumes (vvol) having a selected virtual volume identification (vvid), and selecting a virtual volume block number (vvbn) for the data block from a vvbn space of the selected vvol to allocate the data block (the allocated data block) to the selected vvol;
   adjusting a first block allocation bitmap structure of the aggregate to record the selected pvbn;
   adjusting a second block allocation bitmap structure of the vvol to record the selected vvbn;
   inserting both the selected pvbn and the selected vvbn in a parent block as block pointers to point to the allocated data block on the storage device; and
   maintaining an existing data block after writing to the allocated data block a change directed to data of the existing data block, the existing data block maintained to support a persistent consistent point image of the file system.

30. A method for operating a storage system executing on a computer, comprising:
   executing an operating system on the computer, the operating system configured to write a new data by allocating a new data block and not overwriting existing data on an existing data block;
   maintaining a plurality of virtual volumes (vvols) by the operating system;
   performing an allocation of the new data block by the operating system, the allocation,
      selecting a physical volume block number (pvbn) for the new data block from a pvbn space of an aggregate, where the aggregate is a physical volume formed from one or more groups of storage devices coupled to the computer and organized into a global storage space, the new data block resident on one of the storage devices;
      selecting a virtual volume of the plurality of virtual volumes (vvol) having a selected virtual volume identification (vvid), and selecting a virtual volume block number (vvbn) for the new data block from a vvbn space of the selected vvol to allocate the new data block to the selected vvol;
      adjusting a first block allocation bitmap structure of the aggregate to record the selected pvbn;
      adjusting a second block allocation bitmap structure of the vvol to record the selected vvbn;
      inserting both the selected pvbn and the selected vvbn in a parent block as block pointers to point to the new data block on the storage device; and
   maintaining an existing data block after writing to the new data block a change directed to data of the existing data block, the existing data block maintained to support a persistent consistent point image of the file system.

31. A storage system executing on a computer, comprising:
an operating system to execute on the computer, the operating system configured to write a new data by allocating a new data block and not overwriting existing data on an existing data block;
a plurality of virtual volumes (vvols) maintained by the operating system;
an allocator to perform an allocation method of the new data block by the operating system, the allocation method having,
   a physical volume block number (pvbn) selected for the new data block from a pvbn space of an aggregate, where the aggregate is a physical volume formed from one or more groups of storage devices coupled to the computer and organized into a global storage space, the new data block resident on one of the storage devices;
   a virtual volume selected from the plurality of virtual volumes (vvol) having a selected virtual volume identification (vvid), and a virtual volume block number (vvbn) selected for the new data block from a vvbn space of the selected vvol to allocate the new data block to the selected vvol;
   a first block allocation bitmap structure of the aggregate adjusted to record the selected pvbn;
   a second block allocation bitmap structure of the vvol adjusted to record the selected vvbn;
   a parent block containing both the selected pvbn and the selected vvbn as pointers to point to the new data block on the storage device; and
an existing data block maintained after writing to the new data block a change directed to data of the existing data block, the existing data block maintained to support a persistent consistent point image of the file system.

32. A computer readable storage media, comprising:
said computer readable storage media containing program instructions for execution on a processor for a method of operating a storage system, the program instructions,
executing an operating system on the computer, the operating system configured to write a new data by allocating a new data block and not overwriting existing data on an existing data block;
maintaining a plurality of virtual volumes (vvols) by the operating system;
performing an allocation of the new data block by the operating system, the allocation,
  selecting a physical volume block number (pvbn) for the new data block from a pvbn space of an aggregate, where the aggregate is a physical volume formed from one or more groups of storage devices coupled to the computer and organized into a global storage space, the new data block resident on one of the storage devices;
  selecting a virtual volume of the plurality of virtual volumes (vvol) having a selected virtual volume identification (vvid), and selecting a virtual volume block number (vvbn) for the new data block from a vvbn space of the selected vvol to allocate the new data block to the selected vvol;
  adjusting a first block allocation bitmap structure of the aggregate to record the selected pvbn;
  adjusting a second block allocation bitmap structure of the vvol to record the selected vvbn;
  inserting both the selected pvbn and the selected vvbn in a parent block as block pointers to point to the new data block on the storage device; and
an existing data block maintained after writing to the new data block a change directed to data of the existing data block, the existing data block maintained to support a persistent consistent point image of the file system.

33. A method for operating a storage system executing on a computer, comprising:
executing an operating system on the computer, the operating system configured to respond to an event in the operating system by allocating a new data block to write a new data to the new data block and to not overwrite existing data on an existing data block;
maintaining a plurality of virtual volumes (vvols) by the operating system;
performing an allocation of the new data block by the operating system, the allocation,
  selecting a physical volume block number (pvbn) for the new data block from a pvbn space of an aggregate, where the aggregate is a physical volume formed from one or more groups of storage devices coupled to the computer and organized into a global storage space, the new data block resident on one of the storage devices;
  selecting a virtual volume of the plurality of virtual volumes (vvol) having a selected virtual volume identification (vvid), and the operating system selecting a virtual volume block number (vvbn) for the new data block from a vvbn space of the selected vvol to allocate the new data block to the selected vvol;
  adjusting a first block allocation bitmap structure of the aggregate to record the selected pvbn;
  adjusting a second block allocation bitmap structure of the vvol to record the selected vvbn;
  inserting both the selected pvbn and the selected vvbn in a parent block as block pointers to point to the new data block on the storage device; and
maintaining an existing data block after writing to the new data block a change directed to data of the existing data block, the existing data block maintained to support a persistent consistent point image of the file system.

34. The method as in claim 33, further comprising:
responding to writing a file as the event.

35. The method as in claim 33, further comprising:
responding to updating a file as the event.

36. The method as in claim 33, further comprising:
responding to a client accessing data stored on the storage system as the event.

37. A storage system executing on a computer, comprising:
an operating system to execute on the computer, the operating system configured to respond to an event in the operating system by allocating a new data block to write a new data to the new data block and to not overwrite existing data on an existing data block;
a plurality of virtual volumes (vvols) maintained by the operating system;
an allocation of the new data block performed by the operating system, the allocation having,
  a physical volume block number space (pvbn space) selected for the new data block from a pvbn space of an aggregate, where the aggregate is a physical volume formed from one or more groups of storage devices coupled to the computer and organized into a global storage space, the new data block resident on one of the storage devices;
  a virtual volume of the plurality of virtual volumes (vvol) having a selected virtual volume identification (vvid), and the operating system to select a virtual volume block number (vvbn) for the new data block from a vvbn space of the selected vvol to allocate the new data block to the selected vvol;
  a first block allocation bitmap structure of the aggregate adjusted to record the selected pvbn;
  a second block allocation bitmap structure of the vvol adjusted to record the selected vvbn;
  a parent block containing both the selected pvbn and the selected vvbn as block pointers to point to the new data block on the storage device; and
an existing data block maintained after writing to the new data block a change directed to data of the existing data block, the existing data block maintained to support a persistent consistent point image of the file system.

38. The storage system as in claim 37, further comprising:
the event is writing a file.

39. The storage system as in claim 37, further comprising:
the event is updating a file.

40. The storage system as in claim 37, further comprising:
the event is a client accessing data stored on the storage system.

41. A computer readable storage media, comprising:
said computer readable storage media containing program instructions for execution on a processor for a method of operating a storage system, the program instructions,
executing an operating system on the computer, the operating system configured to respond to an event in the operating system by allocating a new data block to write a new data to the new data block and to not overwrite existing data on an existing data block;

maintaining a plurality of virtual volumes (vvols) by the operating system;

performing an allocation of the new data block by the operating system, the allocation, selecting a physical volume block number (pvbn) for the new data block from a pvbn space of an aggregate, where the aggregate is a physical volume formed from one or more groups of storage devices coupled to the computer and organized into a global storage space, the new data block resident on one of the storage devices;

selecting a virtual volume of the plurality of virtual volumes (vvol) having a selected virtual volume identification (vvid), and the operating system selecting a virtual volume block number (vvbn) for the new data block from a vvbn space of the selected vvol to allocate the new data block to the selected vvol;

adjusting a first block allocation bitmap structure of the aggregate to record the selected pvbn;

adjusting a second block allocation bitmap structure of the vvol to record the selected vvbn;

inserting both the selected pvbn and the selected vvbn in a parent block as block pointers to point to the new data block on the storage device; and maintaining an existing data block after writing to the new data block a change directed to data of the existing data block, the existing data block maintained to support a persistent consistent point image of the file system.

* * * * *

UNITED STATES PATENT AND TRADEMARK OFFICE
CERTIFICATE OF CORRECTION

PATENT NO. : 7,970,770 B2  Page 1 of 1
APPLICATION NO. : 12/042131
DATED : June 28, 2011
INVENTOR(S) : John K. Edwards It is certified that error appears in the above-identified patent and that said Letters Patent is hereby corrected as shown below:

In Col. 23, line 17 should read:
        an ~~electronic random access memory~~ optical storage device used as the storage Signed and Sealed this
Twenty-seventh Day of March, 2012

David J. Kappos
*Director of the United States Patent and Trademark Office*